(12) United States Patent
Zhang et al.

(10) Patent No.: US 11,634,881 B2
(45) Date of Patent: Apr. 25, 2023

(54) BRIDGE FOUNDATION SCOURING MONITORING SENSOR AND MONITORING DATA ANALYSIS METHOD THEREOF

(71) Applicant: Dongyu Zhang, Harbin (CN)

(72) Inventors: Dongyu Zhang, Harbin (CN); Li Ni, Harbin (CN)

( * ) Notice: Subject to any disclaimer, the term of this patent is extended or adjusted under 35 U.S.C. 154(b) by 144 days.

(21) Appl. No.: 17/163,628

(22) Filed: Feb. 1, 2021

(65) Prior Publication Data

US 2021/0156107 A1 May 27, 2021

(30) Foreign Application Priority Data

Sep. 11, 2020 (CN) .......................... 202010954346.0

(51) Int. Cl.
*G01H 9/00* (2006.01)
*E02D 33/00* (2006.01)
(52) U.S. Cl.
CPC ............. *E02D 33/00* (2013.01); *G01H 9/004* (2013.01); *E02D 2600/10* (2013.01)
(58) Field of Classification Search
None
See application file for complete search history.

(56) References Cited

U.S. PATENT DOCUMENTS

| | | | | |
|---|---|---|---|---|
| 6,181,841 | B1* | 1/2001 | Hodge | G01B 11/16 385/12 |
| 6,647,161 | B1* | 11/2003 | Hodge | G01M 5/0008 385/12 |
| 2018/0120192 | A1* | 5/2018 | Song | G01M 3/12 |

* cited by examiner

*Primary Examiner* — Brandi N Hopkins
*Assistant Examiner* — Nigel H Plumb
(74) *Attorney, Agent, or Firm* — IPro, PLLC (57) ABSTRACT

The disclosure provides a bridge foundation scouring monitoring sensor and a monitoring data analysis method thereof. The disclosed sensor comprises a cover plate, a bottom fixing unit and several standard scouring depth monitoring units fixedly disposed between the cover plate and the bottom fixing unit. Each standard scouring depth monitoring unit comprises an optical fiber vibration string (OFVS) and a supporting frame; the two ends of the OFVS are fixedly connected with the supporting frame; a plurality of polyhedral mass blocks are evenly distributed on the OFBS from top to bottom; and a fiber Bragg grating sensor is disposed at the upper portion of OFBS. The variation of scour depth of bridge foundation induces the change of vibration frequency of the OFVS, which is measured by the fiber Bragg grating sensor. The method of calculating the scour depth from the measured vibration frequency of the OFVS is disclosed.

10 Claims, 8 Drawing Sheets

BRIDGE FOUNDATION SCOURING MONITORING SENSOR AND MONITORING DATA ANALYSIS METHOD THEREOF

TECHNICAL FIELD

The disclosure relates to a bridge foundation scouring monitoring sensor and a monitoring data analysis method thereof, and belongs to the technical field of bridge engineering.

BACKGROUND

Bridge is a critical connection node in the transportation network, and its structural safety is of great significance in guaranteeing the normal operation of the transportation network. Scouring of bridge foundations is one of the main causes of bridge damage. Among 503 bridges with structural failure from 1989 to 2000 counted by the United States, more than 50% of bridge structural damage or failures were caused by scouring of bridge foundations. In addition, people have difficulty in directly observing scouring of bridge foundations as it occurs underneath the water surface. Thus, bridge failures or even collapse caused by scouring of bridge foundations always has the features of suddenness and catastrophe. Thus, it is of great practical significance to research and develop monitoring technology to accurately monitor the scouring depth of a bridge foundation.

Many scholars have put forward several bridge foundation scouring monitoring technologies based on different monitoring principles, mainly including: a buoyancy driven type scouring monitoring technology, a gravity driven type scouring monitoring technology, a scouring monitoring technology based on conductivity measurement, a scouring monitoring technology based on sonar, a scouring monitoring technology based on radar and a scouring monitoring technology based on fiber Bragg gratings (FBG). The buoyancy driven type scouring monitoring technology and the gravity driven type scouring monitoring technology are one-time monitoring methods, and cannot effectively monitor the complicated process of scouring, backwash and secondary scouring of a bridge foundation. The scouring monitoring technology based on conductivity measurement needs to closely attach a monitoring device to a bridge pier, and its measurement precision is affected by water flow and impurities in water. The scouring monitoring technology based on sonar and on radar use complicated monitoring signal analysis technologies, their scouring depth monitoring precision is easily affected by water flow temperature, flow rate, impurities in water and various other factors, and especially, it is difficult to effectively monitor scouring of bridge foundations during the flooding stage when the scouring of bridges frequently occurs. The scouring monitoring technology based on fiber Bragg gratings (FBG) attach to a cantilever bar that is inserted in a riverbed; and the strain of the cantilever bar is measured by the fiber Bragg gratings to reflect the scouring situation of the riverbed when the burying and fixing depth of the cantilever bar is changed due to scouring of river; the scouring depth monitoring precision of this method is determined by the distribution spatial distance of the fiber Bragg gratings, which makes it difficult to realize high-precision measurement of the scouring depth. It can be seen from the above analysis that so far there is no reliable, efficient, and high-precision bridge foundation scouring depth monitoring technology worldwide.

SUMMARY

The disclosure provides a bridge foundation scouring monitoring sensor and a monitoring data analysis method thereof in order to solve the problem that existing bridge foundation scouring monitoring technologies cannot realize reliable, efficient, and high-precision bridge foundation scouring depth monitoring.

In order to solve the above technical problem, the disclosure adopts the technical scheme as follows:

The bridge foundation scouring monitoring sensor includes a cover plate, a lower fixing unit and several scouring depth monitoring standard units fixedly disposed between the cover plate and the lower fixing unit. Each scouring depth monitoring standard unit includes a supporting frame and an optical fiber vibration string disposed in the supporting frame; the upper end and the lower end of each optical fiber vibration string are both fixedly connected with the corresponding supporting frame; a plurality of polyhedral mass blocks are evenly distributed on each optical fiber vibration string from top to bottom; and a fiber Bragg grating is disposed at the upper portion of each optical fiber vibration string.

Further, the number of the scouring depth monitoring standard units can be more than one, and all scouring depth monitoring standard units are fixedly connected end to end in sequence from top to bottom.

Further, a product of the number and height of the scouring depth monitoring standard units is greater than or equal to the maximum scouring monitoring depth.

Further, a product of the number of the polyhedral mass blocks in each scouring depth monitoring standard unit plus one and the scouring depth monitoring precision is greater than the height of the scouring depth monitoring standard units.

Further, the lower fixing unit includes a cylindrical section and a conical section which are fixedly connected in sequence from top to bottom, and the large end of the conical section and the bottom end of the cylindrical section are fixedly connected integrally.

Further, each optical fiber vibration string includes a steel cable, an optical fiber, and a polymer outer protective sleeve; the steel cable and the optical fiber are attached; and the polymer outer protective sleeve protects the steel cable and the optical fiber.

Further, each steel cable is a stainless-steel cable.

Further, each supporting frame includes two partition plates disposed up and down and a plurality of stand columns fixedly disposed between the two partition plates, and the corresponding optical fiber vibration string is located in an area defined by the plurality of stand columns.

Further, the number of the stand columns is three, and the stand columns are evenly distributed between the two partition plates in the circumferential direction.

The monitoring data analysis method of the bridge foundation scouring monitoring sensor includes the following steps:

step 1, dispose the scouring monitoring sensor at a bridge foundation scouring monitoring position via pile driving; connect the scouring monitoring sensor with a fiber Bragg grating demodulator, disposed on a bridge pier or a bridge, through an armored cable; and obtain strain responses, measured by the gratings in the scouring monitoring sensor, of the optical fiber vibration strings by the fiber Bragg grating demodulator through analyzing the spectrum;

step 2, assume that sludge has a constraint on the optical fiber vibration strings buried by the sludge, according to the corresponding position where the scouring depth reaches on each polyhedral mass block in each scouring depth monitoring standard unit, an optical fiber vibration string kinetic model is established, which considers the constraint of the sludge at different scouring depths;

step 3, calculate natural vibration frequencies of the optical fiber vibration strings at different scouring depths for the optical fiber vibration string kinetic model established in step 2;

step 4, draw a curve of the relationship between the burying and fixing depth of the sludge and the natural vibration frequencies of the optical fiber vibration strings according to the result of step 3 to establish a model of the correspondence between the different scouring depths of the bridge foundation and the natural vibration frequencies of the optical fiber vibration strings;

step 5, measure strain time-history responses of the optical fiber vibration strings by the gratings on the optical fiber vibration strings; piecewise analyze the continuously monitored strain time-history responses by a sliding window. If a dynamic strain response in the strain measured by the gratings is quite small, it is determined that scouring of the bridge foundation does not develop to a burial depth of the corresponding scouring depth monitoring standard unit;

step 6, when there is an obvious dynamic strain response in the strain measured by the gratings, perform Fourier transformation on the dynamic strain response; extract a Fourier response peak; and identify the natural vibration frequency of the corresponding optical fiber vibration string; and step 7, in combination with the natural vibration frequencies of the optical fiber vibration strings identified in step 6 and the model of the correspondence between the different scouring depths and the natural vibration frequencies of the optical fiber vibration strings established in step 3, the scouring depth of the bridge foundation can be determined.

Compared with the state of the art of current technology, the disclosure has the following effects:

The bridge foundation scouring monitoring sensor of the disclosure realizes long-term real-time monitoring on the scouring depth of a bridge foundation and has higher monitoring efficiency and reliability compared with the previous technology.

The natural vibration frequencies of the optical fiber vibration strings in the disclosure can gradually decrease as the scouring depth of the bridge foundation increases, and thus the scouring depth monitoring standard units have high recognition precision for the scouring depth of the bridge foundation.

Fixing force of the lower half part of each optical fiber vibration string in sludge is mainly provided by the corresponding polyhedral mass blocks, and thus the scouring depth monitoring precision of the scouring depth monitoring standard units can be adjusted by changing the spacing distance of the polyhedral mass blocks.

DETAILED DESCRIPTION

Embodiment 1: the present embodiment is described in conjunction with FIGS. 1-6, a bridge foundation scouring monitoring sensor includes a cover plate 1, a lower fixing unit 2 and scouring depth monitoring standard units 3 fixedly disposed between the cover plate 1 and the lower burying and fixing unit 2. Each scouring depth monitoring standard unit 3 includes a supporting frame 31 and an optical fiber vibration string 32 disposed in the supporting frame 31. The upper end and the lower end of each optical fiber vibration string 32 are both fixedly connected with the corresponding supporting frame 31; a plurality of polyhedral mass blocks 33 are evenly distributed on each optical fiber vibration string 32 from top to bottom; and a fiber Bragg grating 34 is disposed at the upper portion of each optical fiber vibration string 32.

Figure 2:
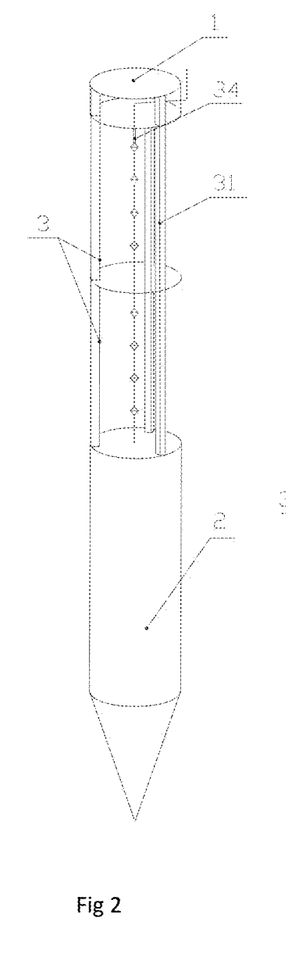
FIG. 2 is a schematic diagram of three-dimension structure of the bridge foundation scouring monitoring sensor of the disclosure.
Figure 3:
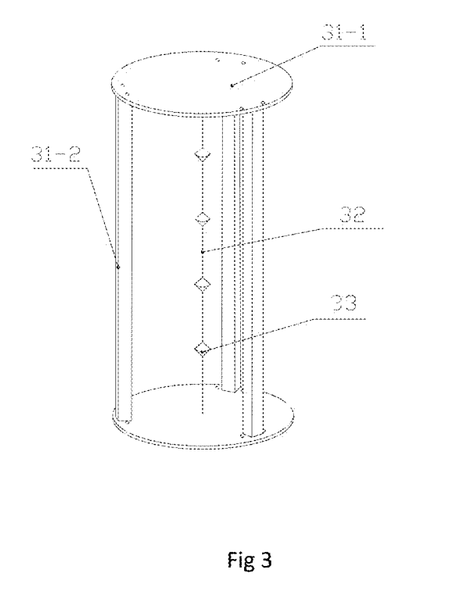
FIG. 3 is a schematic diagram of three-dimension structure of a scouring depth monitoring standard unit.

The scouring depth monitoring standard units 3 are core components of the sensor of the disclosure. An optical fiber vibration string system is formed on the basis of the scouring depth monitoring standard units 3 to effectively monitor the scouring depth of a bridge foundation.

Figure 1:
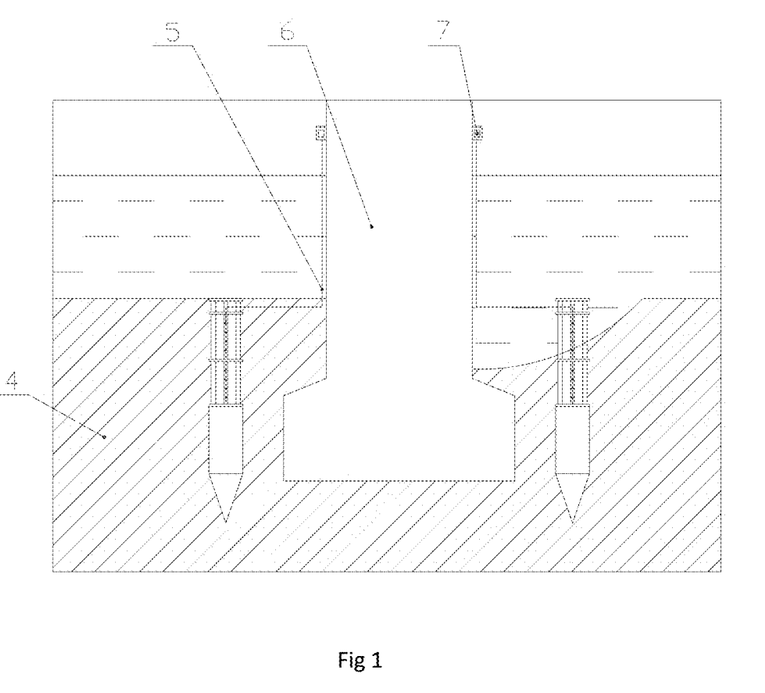
FIG. 1 is a schematic diagram of the composition of monitoring system based on the bridge foundation scouring monitoring sensor of the disclosure.

The sensor of the disclosure is directly buried in a riverbed 4 near the bridge foundation via pile driving to monitor the scouring depth of the bridge foundation. The sensor is fixed into sludge on the riverbed 4 by the lower burying and fixing unit 2 to make sure that the sensor cannot be knocked down by water flow during scouring, and thus the sensor can be used for monitoring the whole process of scouring, backwash and secondary scouring of the bridge foundation. The scouring depth monitoring standard units 3 are configured to measure the scouring depth of the sludge on the riverbed 4. The cover plate 1 is configured to bear the pile driving acting force from the upper side.

The optical fiber vibration strings 32 are fixed by the supporting frame 31.

The bridge foundation scouring monitoring sensor of the disclosure can realize long-term real-time monitoring on scouring depth of the bridge foundation.

Figure 5:
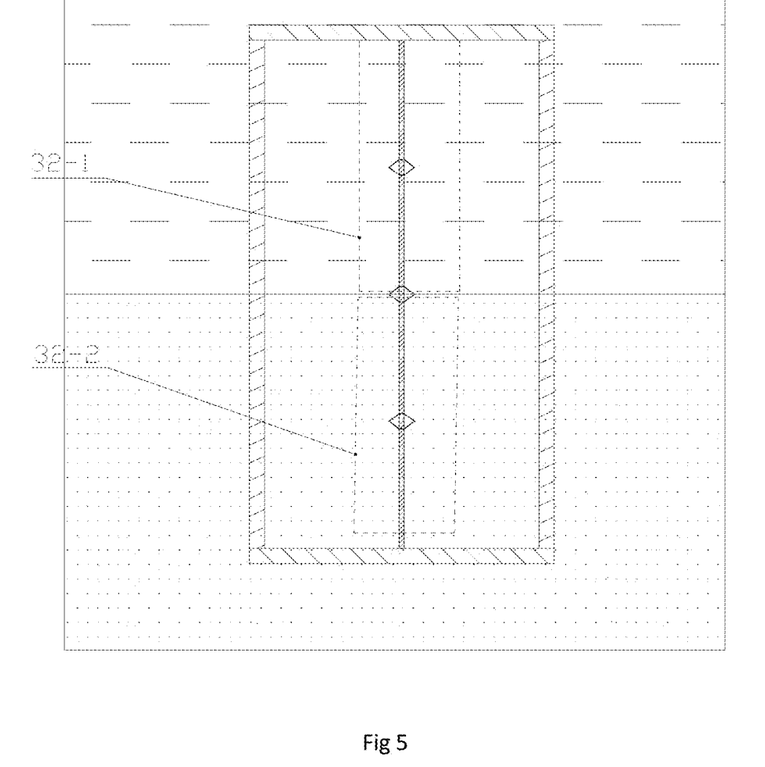
FIG. 5 is a schematic diagram of the monitoring principle of a scouring depth monitoring standard unit.

Working Principle:

When scouring of the bridge foundation does not develop to the burial depth of the scouring depth monitoring standard units 3, the optical fiber vibration strings 32 cannot vibrate due to the constraint of the sludge on the riverbed 4, and thus the gratings 34 are unable to monitor dynamic strain signals generated by the vibration of the optical fiber vibration strings 32. When the bridge foundation scouring develops to the burial depth of the scouring depth monitoring standard units 3, the sludge on upper half parts 32-1 of the optical fiber vibration strings 32 starts to be washed away by flowing water, and the sludge that is not scoured away still has a constraint effect on lower half parts 32-2 of the optical fiber vibration strings 32; the upper half parts 32-1 of the optical fiber vibration strings 32 vibrate under the mutual action of the polyhedral mass blocks 33 distributed on the upper half parts 32-1 of the optical fiber vibration strings 32 and the flowing water, the dynamic strain of the optical fiber vibration strings 32 generated by the vibration is measured by the fiber Bragg gratings 34, and natural vibration frequencies of the optical fiber vibration strings 32 under the condition that the lower half parts 32-2 of the optical fiber vibration strings 32 are constrained by the sludge are acquired by analyzing the dynamic strain data measured by the gratings 34. When the scouring depth of the bridge foundation gradually develops, lengths of the portions, constrained by the sludge, of the lower half parts 32-2 of the optical fiber vibration strings 32 gradually decrease, and lengths of the upper half parts 32-1 of the optical fiber vibration strings 32 gradually increase, resulting in gradual decreasing of the natural vibration frequencies of the optical fiber vibration strings 32. Therefore, through identifying the natural vibration frequencies of the optical fiber vibration strings 32 by analyzing the dynamic strain data measured by the fiber Bragg gratings 34, the lengths of the portions, constrained by the sludge, of the lower half parts 32-2 of the optical fiber vibration strings 32 can be obtained, and thus the scouring depth of the bridge foundation is acquired.

The natural vibration frequencies of the optical fiber vibration strings 32 in the disclosure can gradually decrease with the increase of the scouring depth of the bridge foundation, and thus the scouring depth monitoring standard units 3 have a high precision for the scouring depth identification of the bridge foundation.

Fixing force of the lower half part 32-2 of each optical fiber vibration string 32 is mainly provided by the corresponding polyhedral mass blocks 33, and thus the scouring depth monitoring precision of the scouring depth monitoring standard units 3 can be adjusted by changing the spacing distance of the polyhedral mass blocks 33.

By disposing the plurality of polyhedral mass blocks 33, the bridge foundation scouring monitoring sensor may have the following effects:

1. when the bridge foundation scouring develops to the burial depth of the scouring depth monitoring standard units 3, the polyhedral mass blocks 33 may increase the interaction between the upper half parts 32-1, which are not constrained by sludge, of the optical fiber vibration strings 32 and water flow increase vibration amplitudes of the optical fiber vibration strings 32, and thereby allowing the fiber Bragg gratings 34 to more accurately measure strain responses of the optical fiber vibration strings 32;

2. Fixing force of the lower half parts 32-2 of the optical fiber vibration strings 32 in sludge is increased, so that the natural vibration frequencies of the optical fiber vibration strings 32 change in an obvious stepped mode, and the scouring depth of the bridge foundation may be identified by analyzing the natural vibration frequencies of the optical fiber vibration strings 32; and 3. optimization design of mass distribution of the polyhedral mass blocks 33 can be made to improve the sensitivity of the changes of the natural vibration frequencies of the optical fiber vibration strings 32 to the changes of the scouring depth of the bridge foundation (namely changing of the burial depth in the sludge), thereby improving the accuracy of the bridge foundation scouring depth monitoring.

The number of the scouring depth monitoring standard units 3 is plurality, and the plurality of scouring depth monitoring standard units 3 are fixedly connected end to end in sequence from top to bottom and are connected with one another in series. The plurality of scouring depth monitoring standard units 3 are connected in series, thereby enlarging the bridge foundation scouring depth monitoring range of the scouring monitoring sensor without affecting the precision of the scouring depth monitoring. The problem that the optical fiber vibration strings 32 are easily damaged under excessive impact force of water flow due to the long height of the single scouring depth monitoring standard unit 3 is avoided.

A product of the number and height of the scouring depth monitoring standard units 3 is greater than or equal to the maximum scouring monitoring depth, that is, the number of the scouring depth monitoring standard units is determined jointly by the maximum scouring monitoring depth and the height of the scouring depth monitoring standard units.

A product of a value obtained after the number of the polyhedral mass blocks 33 in each scouring depth monitoring standard unit 3 plus one and the scouring depth monitoring precision is greater than the height of the scouring depth monitoring standard units, that is, the number of the polyhedral mass blocks 33 in each scouring depth monitoring standard unit 3 is determined jointly by the height of the scouring depth monitoring standard units and the scouring depth monitoring precision.

The lower fixing unit 2 includes a cylindrical section and a conical section which are fixedly connected in sequence from top to bottom, and the large end of the conical section and the bottom end of the cylindrical section are fixedly connected integrally. Thus, pile driving is facilitated.

Figure 4:
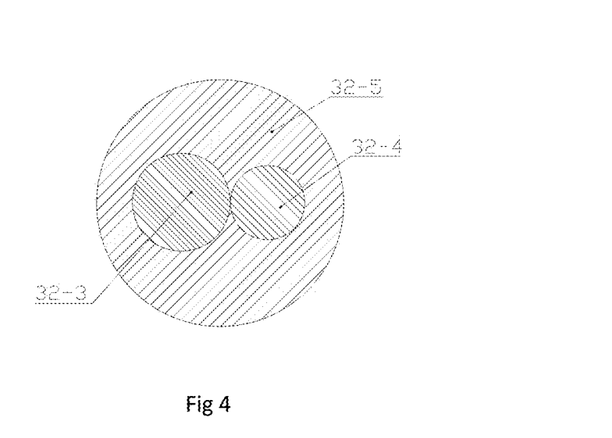
FIG. 4 is a schematic diagram of the cross section of an optical fiber vibration string.

Each optical fiber vibration string 32 includes a steel cable 32-3, an optical fiber 32-4 and a polymer outer protective sleeve 32-5. The steel cable 32-3 and the optical fiber 32-4 are attached. The polymer outer protective sleeve 32-5 sleeves the steel cable 32-3 and the optical fiber 32-4, and the steel cable 32-3 and the optical fiber 32-4 are attached to each other with a chemical reagent. The polymer outer protective sleeve 32-5 protects the steel cable 32-3 and the optical fiber 32-4 against erosion of flowing water. By changing tensile force of the steel cable 32-3, the natural vibration frequency of the optical fiber vibration string 32 may be adjusted.

Each steel cable 32-3 is a stainless steel cable.

Each supporting frame 31 includes two partition plates 31-1 disposed up and down and a plurality of stand columns 31-2 fixedly disposed between the two partition plates 31-1, and the corresponding optical fiber vibration string 32 is located in an area defined by the plurality of stand columns 31-2. The partition plates 31-1 are rigid partition plates.

The number of the stand columns 31-2 is three, and the stand columns 31-2 are evenly distributed between the two partition plates 31-1 in the circumferential direction.

Figure 6:
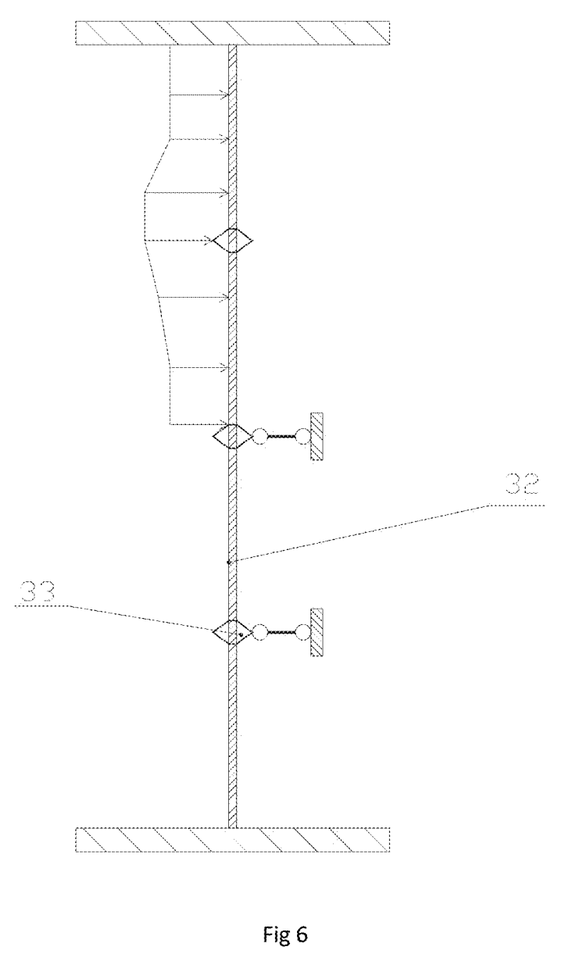
FIG. 6 is a schematic diagram of the kinetic model of a scouring depth monitoring standard unit.
Figure 7A:
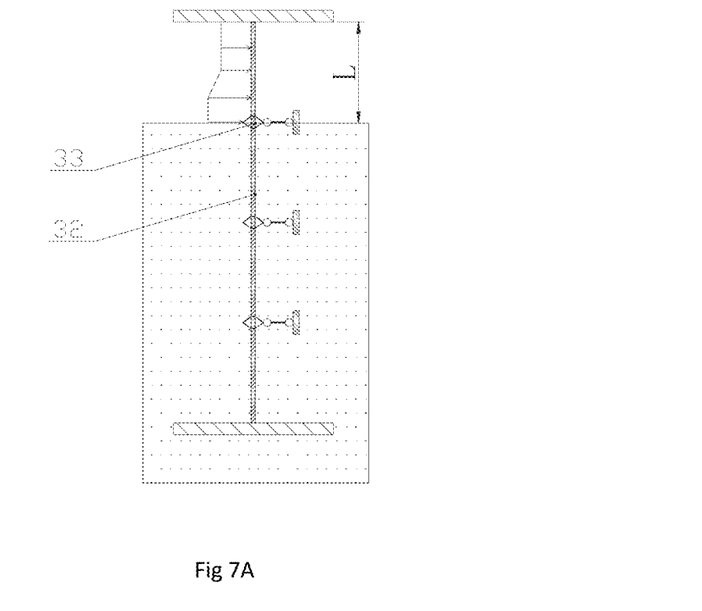
FIG. 7A, FIG. 7B, FIG. 7C and FIG. 7D are diagrams of a kinetic model of a scouring depth monitoring standard unit at different scouring depths, where the scouring depth L in FIG. 7A is 25 cm, the scouring depth L in FIG. 7B is 50 cm, the scouring depth L in FIG. 7C is 75 cm, and the scouring depth L in FIG. 7D is 100 cm.
Figure 7B:
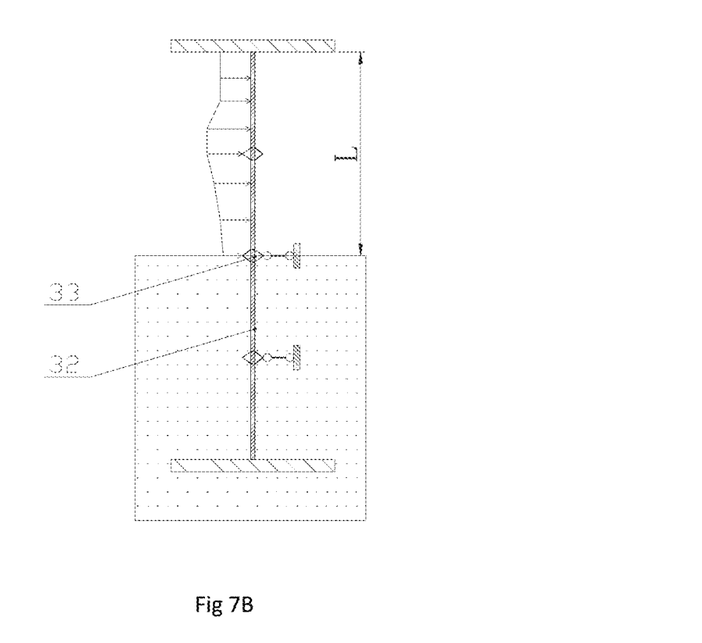
Figure 7C:
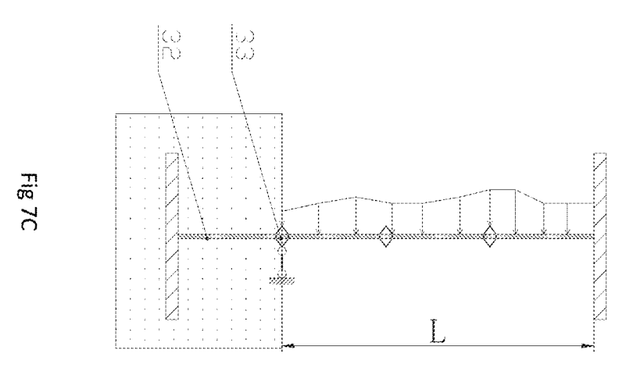
Figure 7D:
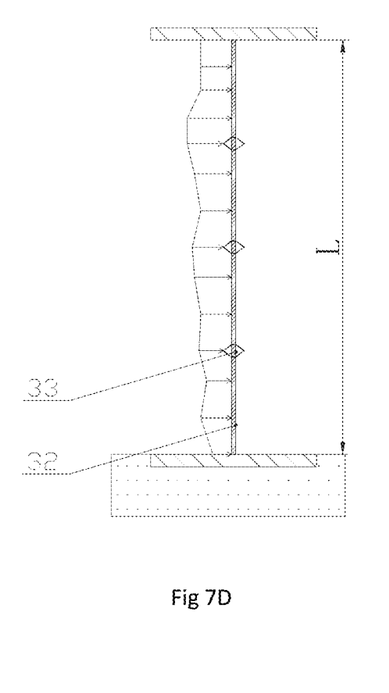
Figure 8:
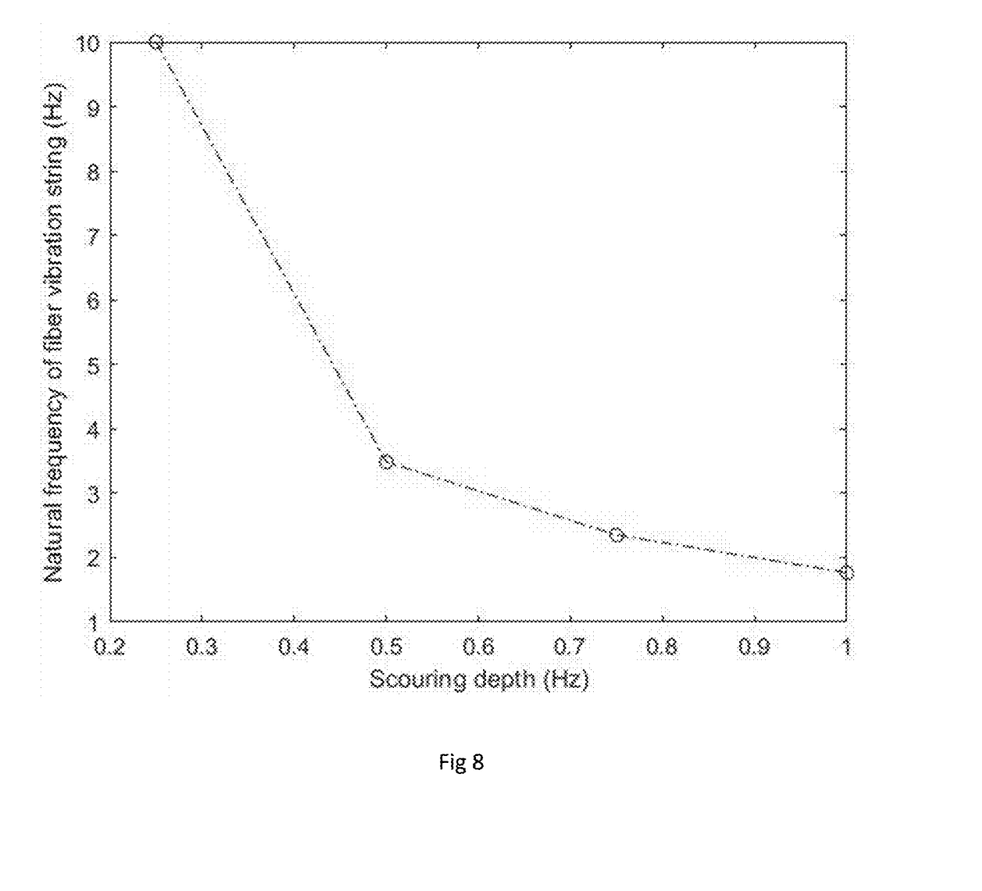
FIG. 8 is a diagram of the corresponding relation between the scouring depth and the natural vibration frequency of an optical fiber vibration string.

A monitoring data analysis method of the bridge foundation scouring monitoring sensor includes the following steps:

step 1, the scouring monitoring sensor is disposed at a bridge foundation scouring monitoring position via pile driving (or other modes); the scouring monitoring sensor is connected with a fiber Bragg grating demodulator 7, disposed on a bridge pier 6 or a bridge, through an armored cable 5; and strain responses, measured by the fiber Bragg gratings 34 in the scouring monitoring sensor, of the optical fiber vibration strings 32 is obtained by the fiber Bragg grating demodulator 7 through analyzing the spectrum;

step 2, assume that sludge has a constraint on the optical fiber vibration strings (32-2) buried by the sludge, according to the corresponding position where the scouring depth reaches on each polyhedral mass block in each scouring depth monitoring standard unit, an optical fiber vibration string (32) kinetic model is established, which considers the constraint of the sludge at different scouring depths;

step 3, natural vibration frequencies of the optical fiber vibration strings 32 at different scouring depths are calculated (by Galerkin method or other methods) for the optical fiber vibration string 32 kinetic model established in step 2; the natural vibration frequencies of the optical fiber vibration strings 32 considers the fixing effect of the sludge;

step 4, a curve of the relationship between the fixing depth (namely the scouring depth of the bridge foundation) of the sludge and the natural vibration frequencies of the optical fiber vibration strings 32 is drawn according to the result of step 3 to establish a corresponding relation model between the different scouring depths of the bridge foundation and the natural vibration frequencies of the optical fiber vibration strings 32;

step 5, strain time-history responses of the optical fiber vibration strings 32 are measured by the fiber Bragg gratings 34 on the optical fiber vibration strings 32; the continuously monitored time-history response of the strain is piecewise analyzed by a sliding window. If a dynamic strain response measured by the fiber Bragg gratings 34 is quite small, it is determined that scouring of the bridge foundation does not develop to the burial depth of the corresponding scouring depth monitoring standard unit 3;

step 6, when there is an obvious dynamic strain response in the strain measured by the fiber Bragg gratings 34, Fourier transformation is performed on the dynamic strain response; a Fourier response peak is extracted; and the natural vibration frequency of the corresponding optical fiber vibration string 32 is identified; and step 7, in combination with the natural vibration frequencies of the optical fiber vibration strings 32 recognized in step 6 and the model of the correspondence between the different scouring depths and the natural vibration frequencies of the optical fiber vibration strings 32 established in step 3, the scouring depth of the bridge foundation is determined.

A design and manufacturing method of the bridge foundation scouring monitoring sensor includes the following steps:

step 1, a layout position, scouring depth monitoring range and scouring depth monitoring precision of the bridge foundation scouring monitoring sensor are determined in accordance with the bridge foundation scouring risk; these parameters may have different requirements for different bridges, which are input variables for designing the scouring sensor;

step 2, the height of the scouring depth monitoring standard units 3 is selected with the consideration of water flow impact borne by the optical fiber vibration strings to prevent the optical fiber vibration strings from bearing excessive water flow impact force. Therefore the height of the scouring depth monitoring standard units 3 shall not be too long, and in actual application, the height of the scouring depth monitoring standard units 3 may be 1-1.5 m;

step 3, the number of the scouring depth monitoring standard units 3 in series connection is determined in accordance with the requirements for the scouring depth monitoring range determined in step 1;

step 4, a layout distance of the polyhedral mass blocks 33 on the optical fiber vibration strings 32 is determined in accordance with the requirements for the scouring depth monitoring precision determined in step 1, and thereby the number of the polyhedral mass blocks disposed on each single scouring depth monitoring standard unit (optimization design may be performed on mass distribution of the polyhedral mass blocks 33) is determined; and step 5, the maximum water flow impact force that acts on the supporting frames of the scouring depth monitoring standard units 3 is calculated in accordance with fluid mechanics when riverbed sludge covering all the scouring depth monitoring standard units 3 is scoured away, and thereby the length of the lower fixing unit 2 of the sensor is designed. It is ensured that when scouring of the bridge foundation develops to the maximum monitoring depth designed by the scouring monitoring sensor, the sensor may not be knocked down by the water flow.

Embodiment 2: the present embodiment is described in conjunction with FIGS. 1-8.

Step 1, the position where bridge pier scouring monitoring needs to be performed; the maximum scouring monitoring depth and the scouring depth monitoring precision are determined in accordance with an analysis report on the bridge foundation scouring risk. The maximum scouring monitoring depth is set to be 2 m and the scouring depth monitoring precision is set to be 0.25 m in the present embodiment.

Step 2, the height of scouring depth monitoring standard units 3 is selected to be 1 m.

Step 3, the number of the scouring depth monitoring standard units in series connection is determined in accordance with the requirement that a product of the number and height of the scouring depth monitoring standard units shall be greater than or equal to the maximum scouring monitoring depth. The requirement of the maximum scouring monitoring depth of 2 m can be met when two scouring depth monitoring standard units are connected in series.

Step 4, the number of polyhedral mass blocks on the optical fiber vibration string in each scouring depth monitoring standard unit 3 is determined. Since the monitoring scouring depth precision is requested to be 0.25 m, a distance between adjacent polyhedral mass blocks shall be not greater than 0.25 m, and thus at least three polyhedral mass blocks shall be disposed on the optical fiber vibration string in each scouring depth monitoring standard unit to meet the requirement for the scouring depth monitoring precision. In the present embodiment, the number of the polyhedral mass blocks on the optical fiber vibration string in each scouring depth monitoring standard unit is three.

Step 5, the maximum water flow impact force borne by the scouring sensor is calculated in accordance with fluid mechanics when riverbed sludge covering all the scouring depth monitoring standard units is scoured away by flowing water according to the water facing area of the cross section of supporting frames of the scouring sensor. In accordance with the impact force and in combination with a soil mechanics single-pile horizontal bearing force design method, the length of the lower burying and fixing unit 2 of the sensor is determined, and in the present embodiment, the length of the lower fixing unit 2 of the sensor is selected to be 1 m.

Step 6, the relationship between frequencies of the optical fiber vibration strings in the scouring depth monitoring standard units 3 and the burial depth of the sludge is established. Four sludge burial depth situations are considered as shown in FIG. 7 for each optical fiber vibration string equipped with three polyhedral mass blocks. In each burial depth situation, assuming that the sludge has a complete rigid fixing effect on the mass blocks, a dynamic model of the optical fiber vibration strings is established. In the present embodiment, parameters of the scouring depth monitoring standard units 3 are selected as follows: the unit height is 1 m, the mass of the optical fiber vibration strings is 0.4 kg/m, the mass of the polyhedral mass blocks is 0.1 kg, and the tensile force of the optical fiber vibration strings is 10 N. Natural vibration frequencies of the optical fiber vibration strings corresponding to each sludge burial depth (scouring depth) situation are calculated by a dynamic method. The correspondence between the scouring depth and the natural vibration frequencies of the optical fiber vibration strings shown in FIG. 8 is drawn according to the calculation result.

Step 7, detailed design and manufacturing are performed on the sensor according to the major parameters of the scouring sensor designed above. The scouring sensor is buried at the bridge foundation scouring monitoring position in a pile driving mode or other modes. The optical fiber of the scouring sensor is connected with a fiber Bragg grating demodulator on a bridge pier through an armored cable.

Step 8, strain time-history responses of the optical fiber vibration strings in the scouring depth monitoring standard units 3 are measured by the fiber Bragg grating demodulator. When the dynamic strain response measured by the fiber Bragg gratings is quite small, it is determined that scouring of the bridge foundation does not develop to the burial depth of the corresponding scouring depth monitoring standard unit.

Step 9, Fourier transformation is performed on the dynamic strain response when there is an obvious dynamic strain response measured by the fiber Bragg gratings to extract a Fourier response peak and identify the natural vibration frequencies of the optical fiber vibration strings.

Step 10, in combination with the model of the correspondence between the natural vibration frequencies of the optical fiber vibration strings and the scouring depth acquired in step 5, the bridge foundation scouring depth is determined.

What is claimed is:

1. A bridge foundation scouring monitoring sensor, comprising a cover plate, a lower fixing unit and scouring depth monitoring standard units fixedly disposed between the cover plate and the lower fixing unit, wherein each scouring depth monitoring standard unit comprises a supporting frame and an optical fiber vibration string disposed in the supporting frame, an upper end and a lower end of each optical fiber vibration string are both fixedly connected with the corresponding supporting frame, a plurality of polyhedral mass blocks are evenly distributed on each optical fiber vibration string from top to bottom, and a fiber Bragg grating is disposed at an upper portion of each optical fiber vibration string.

2. The bridge foundation scouring monitoring sensor according to claim 1, wherein there are a plurality of scouring depth monitoring standard units, and the plurality of scouring depth monitoring standard units are fixedly connected end to end in sequence from top to bottom and are connected with one another in series.

3. The bridge foundation scouring monitoring sensor according to claim 2, wherein a product of the number and height of the plurality of scouring depth monitoring standard units is greater than or equal to the maximum scouring monitoring depth.

4. The bridge foundation scouring monitoring sensor according to claim 3, wherein a product of a value obtained after the number of the polyhedral mass blocks in each scouring depth monitoring standard unit plus one and scouring depth monitoring precision is greater than the height of the scouring depth monitoring standard units.

5. The bridge foundation scouring monitoring sensor according to claim 4, wherein the lower fixing unit comprises a cylindrical section and a conical section being fixedly connected in sequence from top to bottom, and a large end of the conical section and a bottom end of the cylindrical section are fixedly connected integrally.

6. The bridge foundation scouring monitoring sensor according to claim 1, wherein each optical fiber vibration string comprises a steel cable, an optical fiber and a polymer outer protective sleeve, the steel cable and the optical fiber are attached, and the polymer outer protective sleeve sleeves the steel cable and the optical fiber.

7. The bridge foundation scouring monitoring sensor according to claim 6, wherein each steel cable is a stainless steel cable.

8. The bridge foundation scouring monitoring sensor according to claim 7, wherein each supporting frame comprises two partition plates disposed up and down and a plurality of stand columns fixedly disposed between the two partition plates, and the corresponding optical fiber vibration string is located in an area defined by the plurality of stand columns.

9. The bridge foundation scouring monitoring sensor according to claim 8, wherein the number of the stand columns is three, and the stand columns are evenly distributed between the two partition plates in a circumferential direction.

10. A monitoring data analysis method of a bridge foundation scouring monitoring sensor, comprising the following steps:
  step 1, disposing the scouring monitoring sensor at a bridge foundation scouring monitoring position via pile driving; connecting the scouring monitoring sensor with a fiber Bragg grating demodulator, disposed on a bridge pier or a bridge, through an armored cable; and obtaining strain responses, measured by fiber Bragg gratings in the scouring monitoring sensor, of optical fiber vibration strings by the fiber Bragg grating demodulator through analyzing a spectrum;
  step 2, assuming that sludge has a constraint on the optical fiber vibration strings buried by the sludge, according to a corresponding position where a scouring depth reaches on each polyhedral mass block in each scouring depth monitoring standard unit, establishing an optical fiber vibration string kinetic model which considers the constraint of the sludge at different scouring depths;
  step 3, calculating natural vibration frequencies of the optical fiber vibration strings at different scouring depths for the optical fiber vibration string kinetic model established in step 2;
  step 4, drawing a curve of a relationship between fixing depths of the sludge and the natural vibration frequencies of the optical fiber vibration strings according to a result of step 3 to establish a corresponding model between the different scouring depths of the bridge foundation and the natural vibration frequencies of the optical fiber vibration strings;
  step 5, measuring strain time-history responses of the optical fiber vibration strings by the fiber Bragg gratings on the optical fiber vibration strings; piecewise analyzing the continuously monitored strain time-history responses by a sliding window; if a dynamic strain response in the strain measured by the gratings is small, determining that scouring of the bridge foundation does not develop to a burial depth of the corresponding scouring depth monitoring standard unit;

step 6, when there is an obvious dynamic strain response measured by the fiber Bragg gratings, performing Fourier transformation on the dynamic strain response; extracting a Fourier response peak; and identifying the natural vibration frequency of the corresponding optical fiber vibration string; and step 7, in combination with the natural vibration frequencies of the optical fiber vibration strings identified in step 6 and a model of a correspondence between the different scouring depths and the natural vibration frequencies of the optical fiber vibration strings established in step 3, determining a scouring depth of the bridge foundation.

* * * * *